Figure 1:
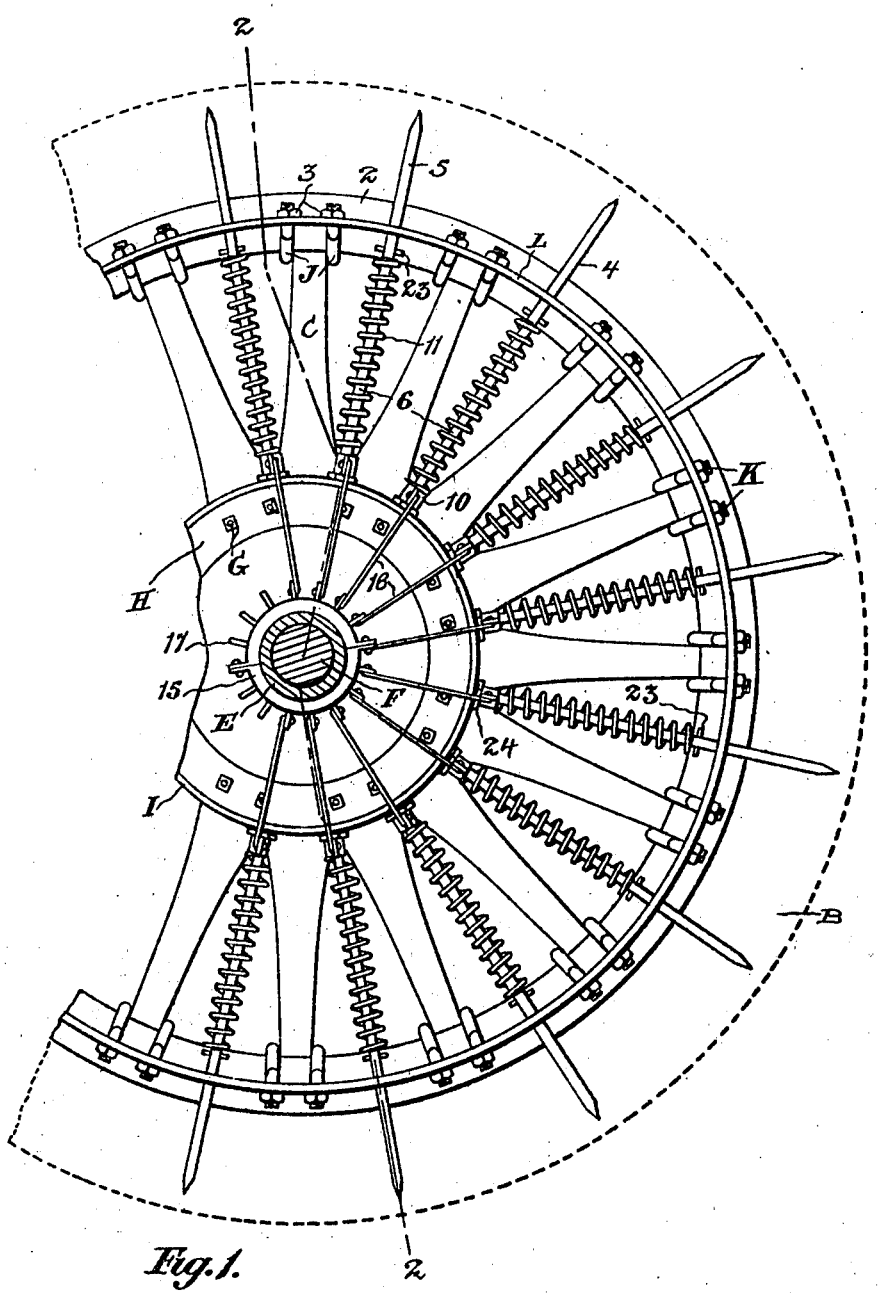

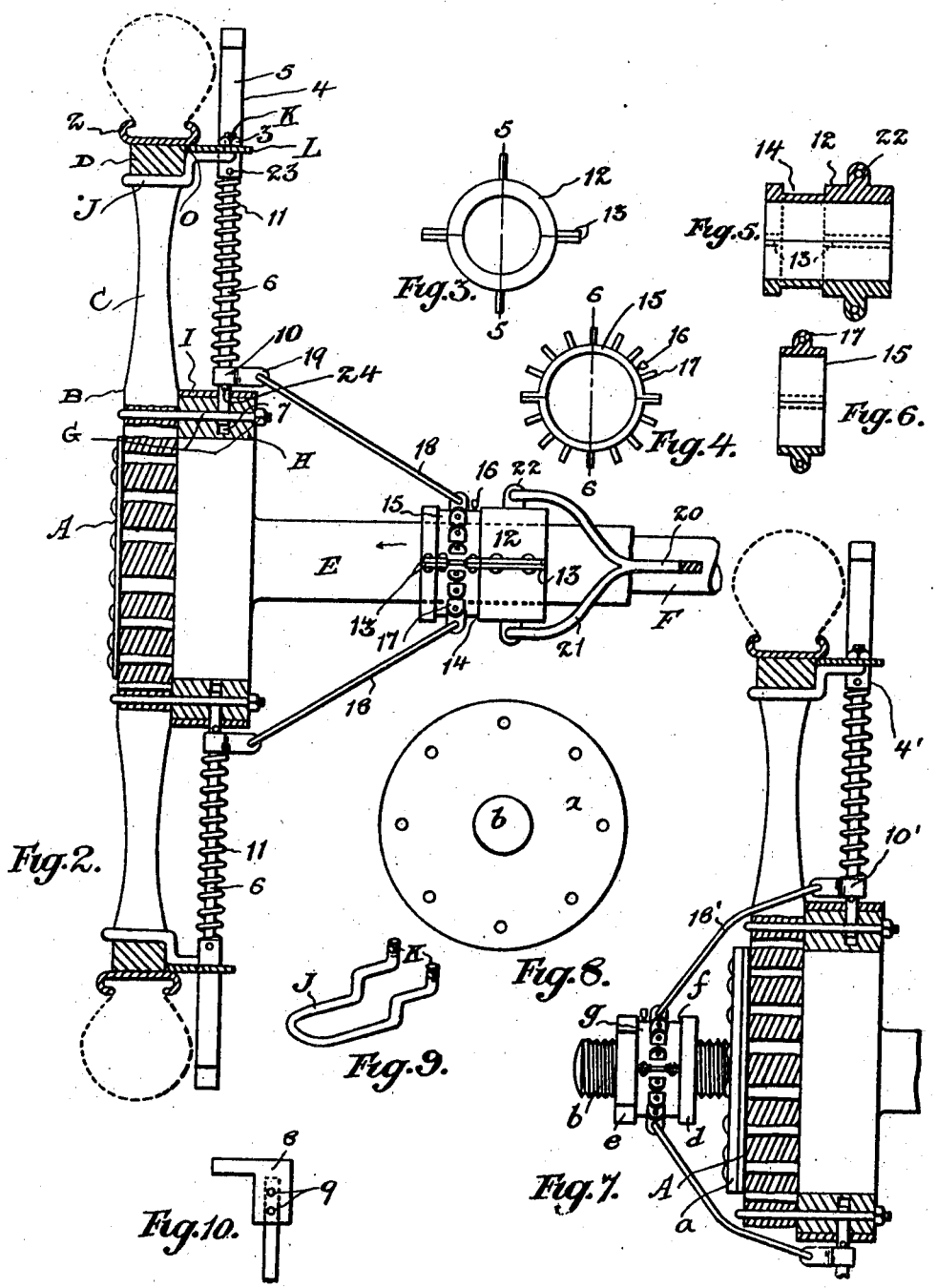

UNITED STATES PATENT OFFICE.

CHARLES FREDERICK HIGHFIELD, OF SALTCOATS, SASKATCHEWAN, CANADA.

TRACTION DEVICE FOR AUTOMOBILE-WHEELS.

1,241,848.  Specification of Letters Patent.  Patented Oct. 2, 1917.

Application filed April 16, 1917.  Serial No. 162,345.

*To all whom it may concern:*

Be it known that I, CHARLES FREDERICK HIGHFIELD, of Saltcoats, Province of Saskatchewan, Canada, have invented certain new and useful Improvements in Traction Devices for Automobile-Wheels, of which the following is a specification.

My invention relates to improvements in traction devices for automobile wheels, and the object of my invention is to provide particularly the drive wheel of an automobile with means which will increase the traction thereof when desired, and at the same time largely prevent skidding and so reduce very considerably danger of accidents from this source.

The construction of my preferred form of invention, and a slight modification thereof, will be hereinafter particularly set forth, and what I claim as new will be pointed out in the claims forming part of this specification.

Figure 1 is an elevation of the major portion of a traction wheel of an automobile, from the inner side thereof, showing the same equipped with my device. Fig. 2 is a cross section on the line 2—2, Fig. 1. Figs. 3 and 4 are end elevations of certain sleeves used in the device, and Figs. 5 and 6 are vertical, longitudinal sections on the line 5—5, Fig. 3, and 6—6, Fig. 4, respectively. Fig. 7 is a view similar to Fig. 2, showing a modification of my device whereby the traction means may be thrown into and out of operation by hand. Fig. 8 is an end elevation of a threaded stud and its attaching flange, used in Fig. 7, and Fig. 9 is a perspective view of a suitable form of clamp I make use of, and Fig. 10 is a side elevation of a removable shoe for the device.

In the drawings, like characters of reference refer to the same parts.

It must be understood that my device can be made use of in connection with the non-driving wheels of an automobile because the invention may be made use of to prevent skidding or slipping, as before mentioned.

It will also be understood that I merely make use of a conventional form of an automobile wheel to illustrate the use of my invention, and its preferred construction.

A is the hub of any suitable type of wheel B. C are the spokes, and D the felly. E is the tubular frame which surrounds the driven shaft F. Secured to the spokes B, by any suitable means such as clamps and nuts, designated by the common character of reference G, is a ring-shaped member H, preferably made of wood for the purpose of reducing weight. The outer surface of the said member H is reinforced by a tire I suitably secured in place. Embracing the spokes C, and resting against the felly D, is a clamp J, the ends K of which are threaded and project through a ring-plate L, the inner edge O of which is clamped between the said clamp and the metal rim 2. 3 are nuts screwing on the threaded ends of the clamps K, so as to securely hold the ring-plate L in position. Radially mounted in the ring-plate L, and in the member H are traction members 4, each composed of a head 5, which operates through the ring-plate L and a stem 6 which operates through the tire I, and extends into a pocket 7 formed in said member H. Any desired number of the traction members 4 may be used, and these members may have the chisel-shaped ends shown; or if desired they may each be provided with a removable shoe 8 of any desired shape secured in place by the screws 9.

Carried by each stem 6 to freely move longitudinally thereof is a short sleeve 10, and mounted on each stem 6 is a coiled compression spring 11. The outer end of each spring 11 rests against the inner end of its associated head 5, and the inner end thereof rests against its associated sleeve 10. Mounted to move longitudinally on the tubular frame E is a sleeve 12. This sleeve is preferably made of two halves, each provided with flanges 13 which are suitably secured together. The said sections of the sleeve 12 are each provided with a circumferential groove which when the sections are placed together, form a circumferential groove 14 in which is mounted to rotate the sleeve 15, likewise formed of two halves, as is the sleeve 12. As will be understood later on, the sleeve 15 must rotate freely, and to provide for this I provide the sleeve with one or more grease cups 16. The said sleeve 15 is radially provided with a plurality of ears 17, in each of which is mounted one end of a rod 18. The other ends of said rods are mounted in the ears 19 carried by the sleeves 10. 20 is a lever, and the members 21 of the forked end thereof, are held in the ears 22, carried by the sleeve 12. By any suitable connections (not shown), convenient to the driver of the car, in order to throw the traction members in position to engage with the roadway, the lever 20 is moved so as to move the sleeves 12 and 15 in the direction indicated by arrow in Fig. 2. The movement of the rods 18 consequent upon the movement just described will, through the medium of the sleeves 10 and springs 11, force the heads 5, of the traction members out the required distance to effect the purpose in view. By the movement in the opposite direction, of the actuating parts just described, the traction members will be withdrawn from contact with the roadway.

At no time is the movement of the traction members 4 sufficient to move the stems 6 out of the pockets 7.

Pins 23 are carried by each head 5 to limit the outward movement of the traction members, and pins 24 carried by the stem 6 limit the inward movement of the sleeves 10, and enable the sleeves 10 to retract the traction members 4.

In the form of my device illustrated in Fig. 7, I show my invention adapted to be operated by hand. For this purpose I dispense with the parts shown in Fig. 2 as mounted on the tubular frame 6, and in place thereof have secured to the hub A a flange a provided with a threaded stud b. Screwing on this threaded stud is a sleeve c provided with end flanges d and e, which form between them a circumferential groove f. Mounted on the said sleeve and to operate in the said groove is a sleeve g, similar in construction to sleeve 15 already described. This sleeve g is connected with the traction members 4' by the rods 18', through the medium of the sleeves 10', the ears of which point in the opposite direction to the position of these ears in Fig. 2. Other co-operating parts in this view will be understood without further description. The flange e is preferably in the form of a nut so that the sleeve c may be turned to adjust its position on the stud b to effect the object in view.

The construction disclosed enables me to readily remove the traction members for repairs or replacement.

Should the traction members be moved into their outermost position, and should the car come in contact with a firm roadway surface, the springs 11 will readily permit the traction members 4 to yield.

While I have described what I consider to be the best embodiments of my invention, I desire it to be understood that the principle can be embodied in different forms, and I desire not to be limited beyond the requirements of the prior art, and the terms of my claims.

Claims:

1. In an automobile, the combination with the felly and spokes therefor, of a circular ring-plate the inner edge of which rests against the said felly; a plurality of substantially U-shaped clamps embracing said spokes near said felly, and each having its outer ends bent at an angle substantially parallel to said spokes and projecting through holes formed in said plate; means whereby said plate and clamps are firmly connected together through the medium of the ends of said clamps; a plurality of radially-disposed traction members mounted to have movement in said ring-plate; flexible means whereby said traction members are allowed to yield according to the character of the road surface they come in contact with; means connected with said traction members for operating the same, and a suitable support for said operating means whereby said operating means has operative movement on the axis of rotation of said wheel.

2. In an automobile wheel, the combination with a felly and spokes therefor, and a metal rim carried by said felly and projecting beyond each side thereof; of a circular ring-plate the inner edge of which rests in the angle formed between one side of said felly and said metal rim, so as to be in contact with these parts; a plurality of substantially U-shaped clamps embracing said spokes near said felly, and each having its outer ends bent at an angle substantially parallel to said spokes and projecting through holes formed in said plate; means whereby said plate and clamps are firmly connected together through the medium of the ends of said clamps; a plurality of radially-disposed traction members mounted to have movement in said ring-plate; flexible means whereby said traction members are allowed to yield according to the character of the road surface they come in contact with; means connected with said traction members for operating the same, and a suitable support for said operating means whereby said operating means has operative movement on the axis of rotation of said wheel.

3. In an automobile wheel, the combination with the felly and spokes therefor; a metal rim carried by said felly and projecting beyond each side thereof, and a ring-shaped member secured to said wheel adjacent the hub thereof, of a circular ring-plate the inner edge of which rests in the angle formed between one side of said felly and metal rim, so as to be in contact with these parts; a plurality of substantially U-shaped clamps embracing said spokes near said felly; means whereby said plate and clamps are firmly clamped together; a plurality of radially disposed traction members mounted to have movement in said ring-plate; and also in said ring-shaped member; a coiled-compression spring mounted on each of said traction members; a sleeve movably mounted on each of said traction members and positioned adjacent said ring-shaped member and designed to transmit movement outwardly to said traction members through the medium of said springs; means whereby said sleeves are permitted to retract said traction members, and means for operating said sleeves, for the purpose specified.

CHARLES FREDERICK HIGHFIELD.

Copies of this patent may be obtained for five cents each, by addressing the "Commissioner of Patents, Washington, D. C."